United States Patent
De Mesmaeker et al.

(10) Patent No.: US 12,461,316 B2
(45) Date of Patent: Nov. 4, 2025

(54) FIBER OPTIC ADAPTER CONVERSION SYSTEM

(71) Applicant: CommScope Technologies LLC, Hickory, NC (US)

(72) Inventors: Marc De Mesmaeker, Leuven (BE); Neil Stewart Bird, Aarschot (BE); Peter Stockmans, Aarschot (BE)

(73) Assignee: CommScope Technologies LLC, Hickory, NC (US)

( * ) Notice: Subject to any disclaimer, the term of this patent is extended or adjusted under 35 U.S.C. 154(b) by 276 days.

(21) Appl. No.: 17/992,314

(22) Filed: Nov. 22, 2022

(65) Prior Publication Data

US 2023/0161111 A1    May 25, 2023

Related U.S. Application Data

(60) Provisional application No. 63/282,013, filed on Nov. 22, 2021.

(51) Int. Cl.
*G02B 6/38*    (2006.01)

(52) U.S. Cl.
CPC ......... *G02B 6/3825* (2013.01); *G02B 6/3849* (2013.01); *G02B 6/3874* (2013.01); *G02B 6/3894* (2013.01)

(58) Field of Classification Search
CPC .. G02B 6/3894; G02B 6/3825; G02B 6/3831; G02B 6/3893; G02B 6/4444; G02B 6/389; G02B 6/3891; G02B 6/387; G02B 6/3871; G02B 6/3873; G02B 6/3874; G02B 6/44465; G02B 6/3897; G02B 6/3849; G02B 6/44528; G02B 6/4248; H02G 15/013
See application file for complete search history.

(56) References Cited

U.S. PATENT DOCUMENTS

| | | | |
|---|---|---|---|
| 6,579,014 B2 | 6/2003 | Melton et al. | |
| 6,648,520 B2 | 11/2003 | Mcdonald et al. | |
| 6,899,467 B2 | 5/2005 | Mcdonald et al. | |
| 7,744,288 B2 | 6/2010 | Lu et al. | |
| 7,869,681 B2 | 1/2011 | Battey et al. | |
| RE42,522 E * | 7/2011 | Zimmel | G02B 6/3897 439/587 |
| 8,891,928 B2 | 11/2014 | Marmon et al. | |
| 9,733,436 B2 | 8/2017 | Van Baelen et al. | |
| 10,684,426 B2 | 6/2020 | Everaert | |
| 10,754,101 B1 * | 8/2020 | Chan | B64D 37/005 |
| 2008/0175546 A1 * | 7/2008 | Lu | G02B 6/3851 385/92 |

(Continued)

FOREIGN PATENT DOCUMENTS

| | | | |
|---|---|---|---|
| CN | 111142193 A * | 5/2020 | |
| WO | 2018149913 A1 | 8/2018 | |

(Continued)

*Primary Examiner* — John Bedtelyon
*Assistant Examiner* — Darby M. Thomason
(74) *Attorney, Agent, or Firm* — Merchant & Gould P.C.

(57) ABSTRACT

The present disclosure relates to enclosures, systems, methods, designs, and assemblies for converting (e.g., modifying, retrofitting, etc.) a first adapter mounting opening compatible with a first type of hardened fiber optic adapter to a second adapter mounting opening compatible with a second type of hardened fiber optic adapter.

12 Claims, 12 Drawing Sheets

(56) References Cited

U.S. PATENT DOCUMENTS

| | | | |
|---|---|---|---|
| 2009/0003772 A1* | 1/2009 | Lu .................. | G02B 6/3869 |
| | | | 385/60 |
| 2009/0148101 A1* | 6/2009 | Lu .................. | G02B 6/3893 |
| | | | 385/56 |
| 2016/0209599 A1* | 7/2016 | Van Baelen ....... | G02B 6/38875 |
| 2018/0196215 A1 | 7/2018 | Claessens et al. | |
| 2019/0170961 A1* | 6/2019 | Coenegracht ........ | G02B 6/4444 |
| 2020/0057222 A1 | 2/2020 | Dannoux et al. | |
| 2022/0299713 A1 | 9/2022 | Lu et al. | |

FOREIGN PATENT DOCUMENTS

| | | |
|---|---|---|
| WO | 2020014210 A1 | 1/2020 |
| WO | 2020236740 A1 | 11/2020 |
| WO | 2021041305 A1 | 3/2021 |

* cited by examiner

FIG. 10
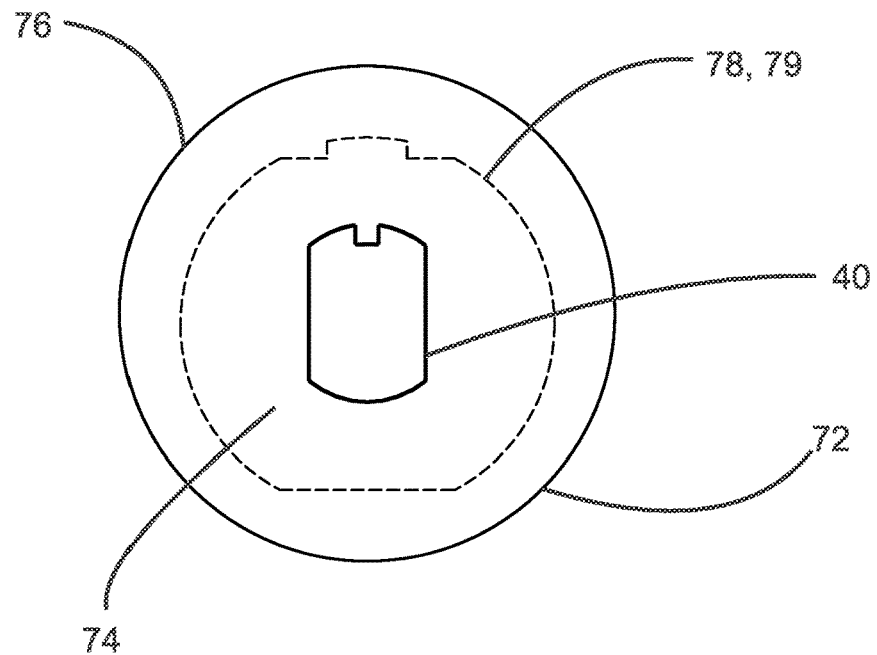
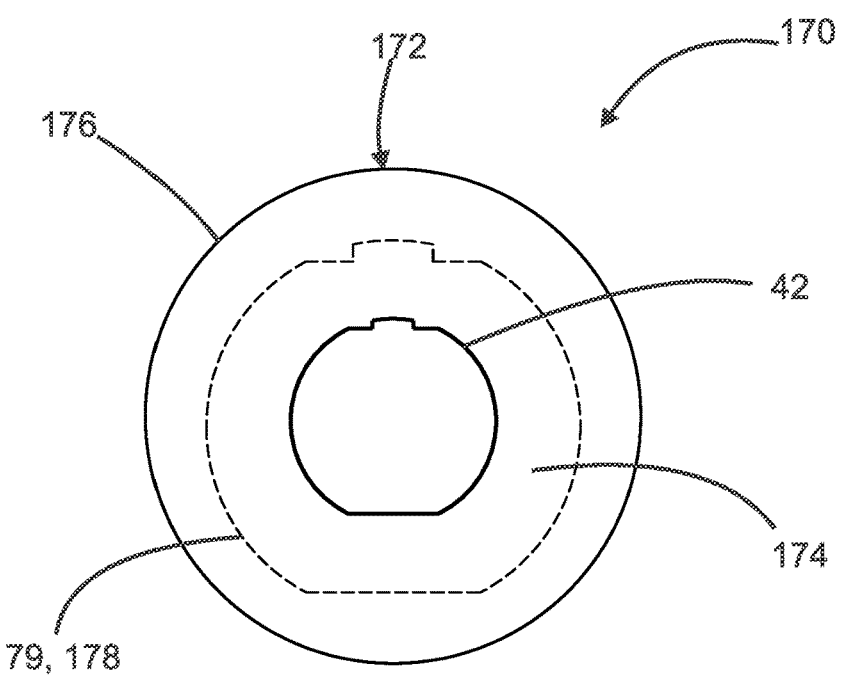
FIG. 14

FIBER OPTIC ADAPTER CONVERSION SYSTEM

CROSS-REFERENCE TO RELATED APPLICATION

This application claims the benefit of U.S. Provisional Application No. 63/282,013, filed Nov. 22, 2021, and titled "FIBER OPTIC ADAPTER CONVERSION SYSTEM" the disclosure of which is hereby incorporated herein by reference.

TECHNICAL FIELD

The present disclosure relates to fiber optic data transmission, and more particularly to fiber optic connection systems such as hardened fiber optic connection systems.

BACKGROUND

Fiber optic cable connection systems are used to facilitate connecting and disconnecting fiber optic cables in the field without requiring a splice. A typical fiber optic cable connection system for interconnecting two fiber optic cables includes fiber optic connectors mounted at the ends of the fiber optic cables, and a fiber optic adapter for mechanically and optically coupling the fiber optic connectors together. Fiber optic connectors generally include ferrules that support the ends of the optical fibers of the fiber optic cables. The end faces of the ferrules are typically polished and are often angled. The fiber optic adapter includes co-axially aligned ports (i.e., receptacles) for receiving the fiber optic connectors desired to be interconnected. The fiber optic adapter includes an internal sleeve that receives and aligns the ferrules of the fiber optic connectors when the connectors are inserted within the ports of the fiber optic adapter. With the ferrules and their associated fibers aligned within the sleeve of the fiber optic adapter, a fiber optic signal can pass from one fiber to the next. The adapter also typically has a mechanical fastening arrangement (e.g., a snap-fit arrangement) for mechanically retaining the fiber optic connectors within the adapter. One example of an existing fiber optic connection system is described at U.S. Pat. Nos. 6,579,014, 6,648,520, and 6,899,467.

Hardened fiber optic connection systems have been developed for facilitating making optical connection in outdoor applications. Hardened fiber optic connection systems generally include hardened fiber optic connectors that are sealed with respect to corresponding hardened fiber optic adapters when mated. The hardened fiber optic adapters are often mounted in sealed relation with respect to corresponding telecommunications housings (e.g., terminals such as drop terminals/multi-service terminals). Example hardened fiber optic connection systems are disclosed by U.S. Pat. No. 7,744,288.

SUMMARY

Aspects of the present disclosure relate to enclosures, systems, methods, designs, and assemblies for converting (e.g., modifying, retrofitting, etc.) a first adapter mounting opening compatible with a first type of hardened fiber optic adapter to a second adapter mounting opening compatible with a second type of hardened fiber optic adapter.

Another aspect of the present disclosure relates to an enclosure including a housing having an interior and an exterior. The housing includes a housing wall defining a first adapter mounting opening that extends between the interior and the exterior of the housing. The first adapter mounting opening has a first form factor corresponding to a first type of fiber optic adapter. The enclosure also includes a converter secured within the first adapter mounting opening. The converter defines a second adapter mounting opening having a second form factor corresponding to a second type of fiber optic adapter. The enclosure further includes a first seal surrounding the first adapter mounting opening. The first seal is compressed between the converter and the housing wall. The enclosure additionally includes a fiber optic adapter of the second type secured within the second adapter mounting opening. The fiber optic adapter includes an adapter body defining an exterior port for receiving a fiber optic connector at the exterior of the housing. The fiber optic adapter includes a ferrule alignment sleeve mounted within the adapter body for receiving a ferrule of the fiber optic connector when the fiber optic connector is installed in the exterior port. The enclosure further includes a second seal surrounding the second adapter mounting opening, the second seal being compressed between the adapter body and the converter.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

FIG. 10 is a front view depicting a first converter for converting one of the first adapter mounting openings of FIG. 1 to be compatible with the second hardened fiber optic adapter of FIG. 5;

FIG. 14 is a front view depicting a second converter for converting one of the first adapter mounting openings of FIG. 1 to be compatible with the third hardened fiber optic adapter of FIG. 12.

DETAILED DESCRIPTION

Aspects of the present disclosure relate to enclosures, systems, methods, designs, and assemblies for converting (e.g., modifying, retrofitting, etc.) a first adapter mounting opening compatible with a first type of hardened fiber optic adapter to a second adapter mounting opening compatible with a second type of hardened fiber optic adapter. In certain examples, the first type of hardened fiber optic adapter has a larger form factor than the second type of hardened fiber optic adapter. In one example, the first type of hardened fiber optic adapter is an Optitap™ type fiber optic adapter sold by Corning Cable Systems Inc. of Hickory, North Carolina, USA. In one example, the second type of hardened fiber optic adapter is a Prodigy™ type fiber optic adapter sold by Commscope Inc. of Hickory, North Carolina, USA. In another example, the second type of hardened fiber optic adapter is a DLX™ type fiber optic adapter sold by Commscope Inc. of Hickory, North Carolina, USA. In a further example, the second type of hardened fiber optic adapter is a FastConnect type fiber optic adapter sold by Huawei Technologies Co. LTD of Shenzhen, China. Of course, aspects of the present disclosure are also applicable to other types of hardened fiber optic adapters than those specifically described herein.

Figure 1:
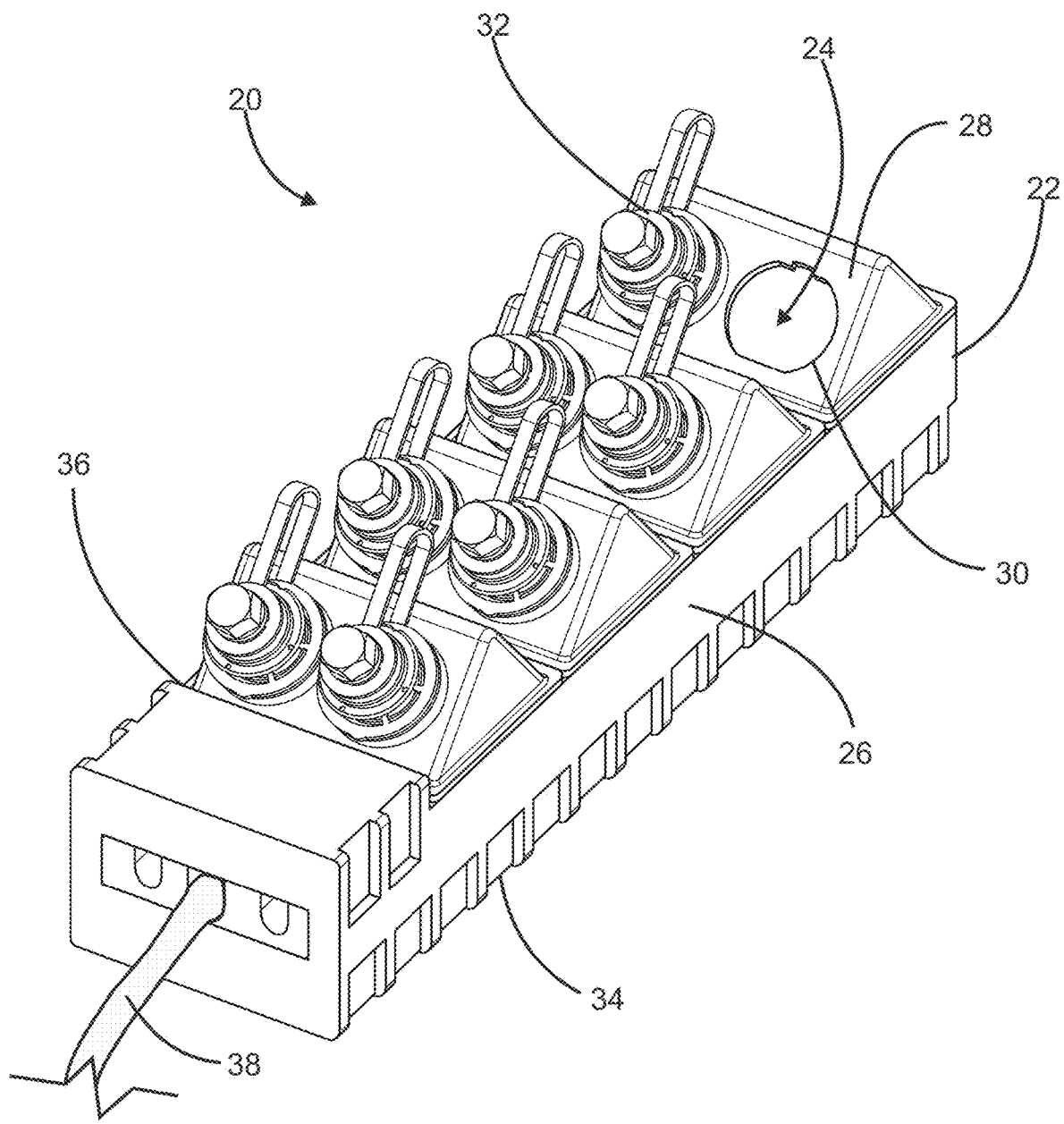
FIG. 1 is a perspective view of a prior art enclosure having first hardened fiber optic adapters mounted within corresponding first adapter mounting openings.
Figure 2:
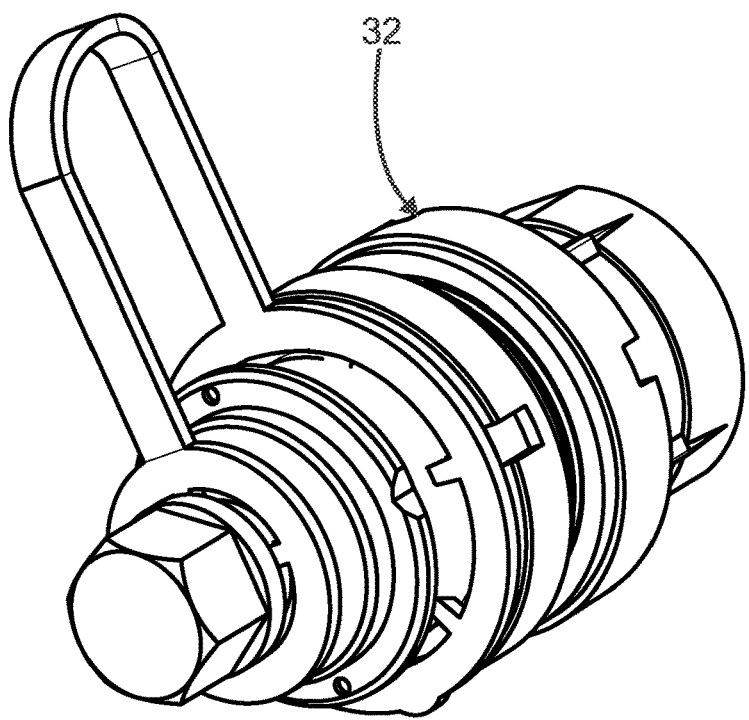
FIG. 2 is a perspective view of one of the first hardened fiber optic adapters of FIG. 1.
Figure 3:
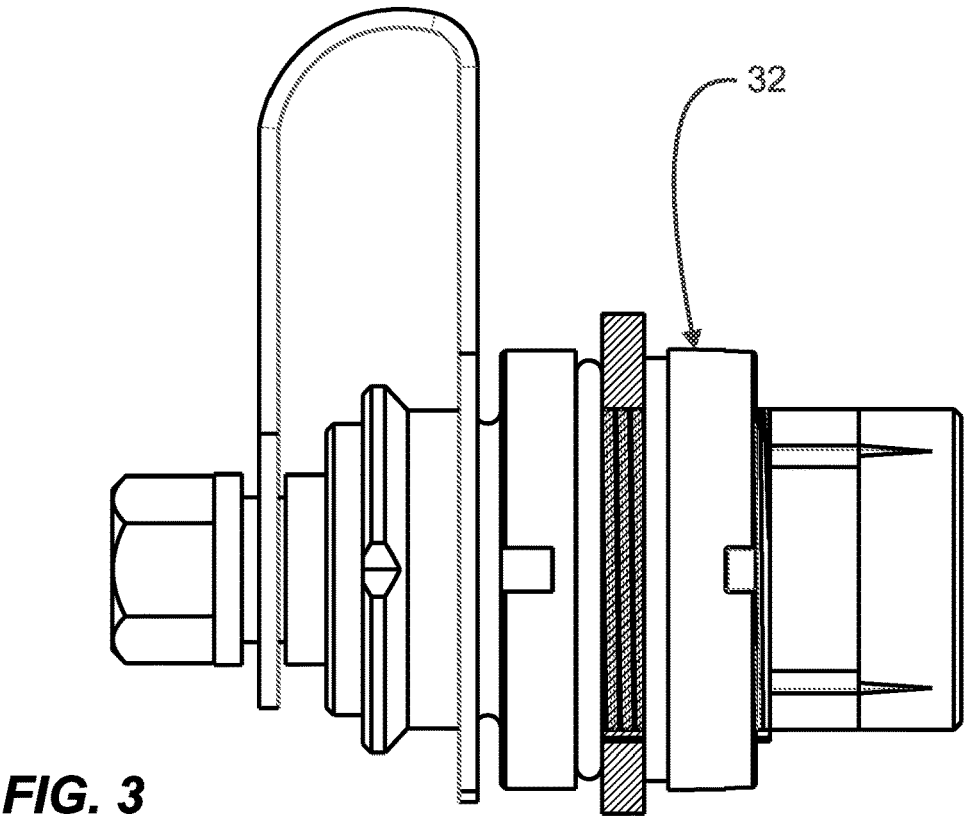
FIG. 3 is a side view of one of the first hardened fiber optic adapters of FIG. 1.

FIG. 1 depicts an enclosure 20 including a housing 22 having an interior 24 and an exterior 26. The housing 22 includes a housing wall 28 defining a first adapter mounting opening 30 having a first form factor corresponding to a first type of fiber optic adapter 32 (see FIGS. 2 and 3). As depicted, the housing 22 defines a plurality of the first adapter mounting openings 30 in which the first fiber optic adapters 32 are mounted. As depicted, the housing 22 includes a base 34 and a cover 36 that mounts to the base in a sealed manner. In the depicted example, the housing wall 28 is integrated with the cover 36.

In the depicted example, the enclosure 20 is shown as a drop terminal/multi-service terminal which is typically installed in the field to provide access locations for optically coupling subscribers to a fiber optic network. A cable 38 such as a feed cable can be routed into the interior of the housing 22 and optical fibers of the cable 38 can be coupled to fiber optic connectors corresponding to each of the first fiber optic adapters 32. The fiber optic connectors can be installed within non-hardened ports of the first fiber optic adapters 32. It will be appreciated that the non-hardened ports of the first fiber optic adapters 32 are accessible from within the interior of the housing 22. The first fiber optic adapters 32 also include hardened ports that are accessible from the exterior of the housing 22. In certain examples, optical components such as passive optical power splitters, wavelength division multiplexers, optical splices, fiber management trays and the like can be positioned within the interior of the housing 22.

Figure 4:
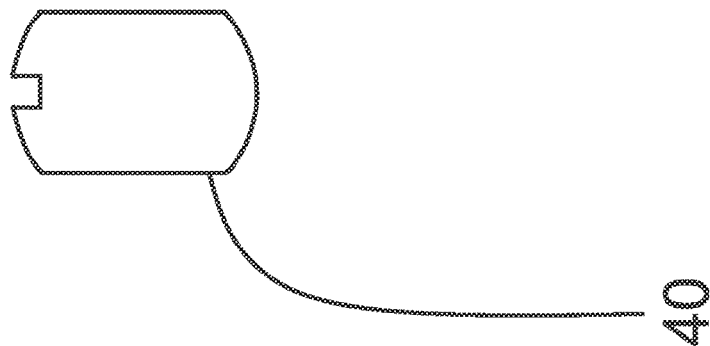
FIG. 4 is a plan view depicting adapter mounting openings corresponding to different types of hardened fiber optic adapters and demonstrating the relative sizes of such adapter mounting openings.
Figure 4:
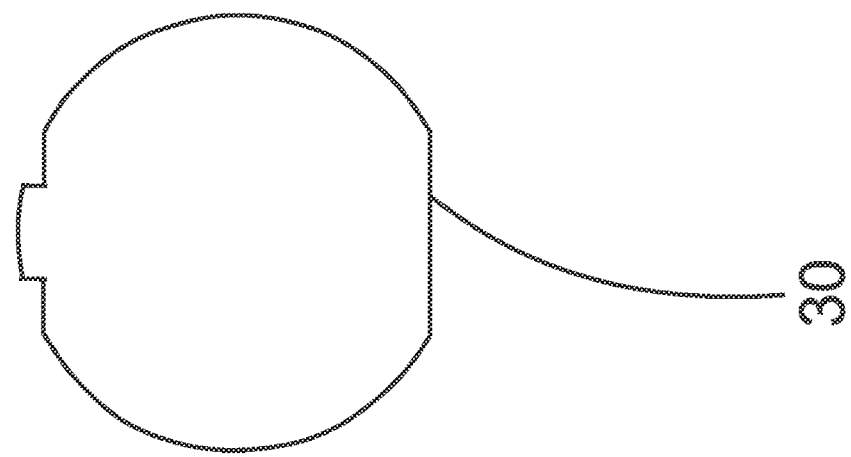
Figure 4:
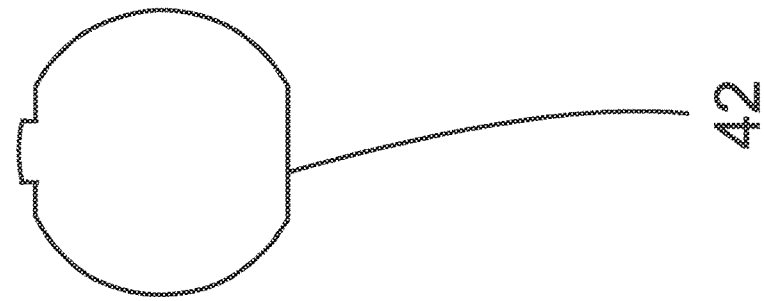
Figure 5:
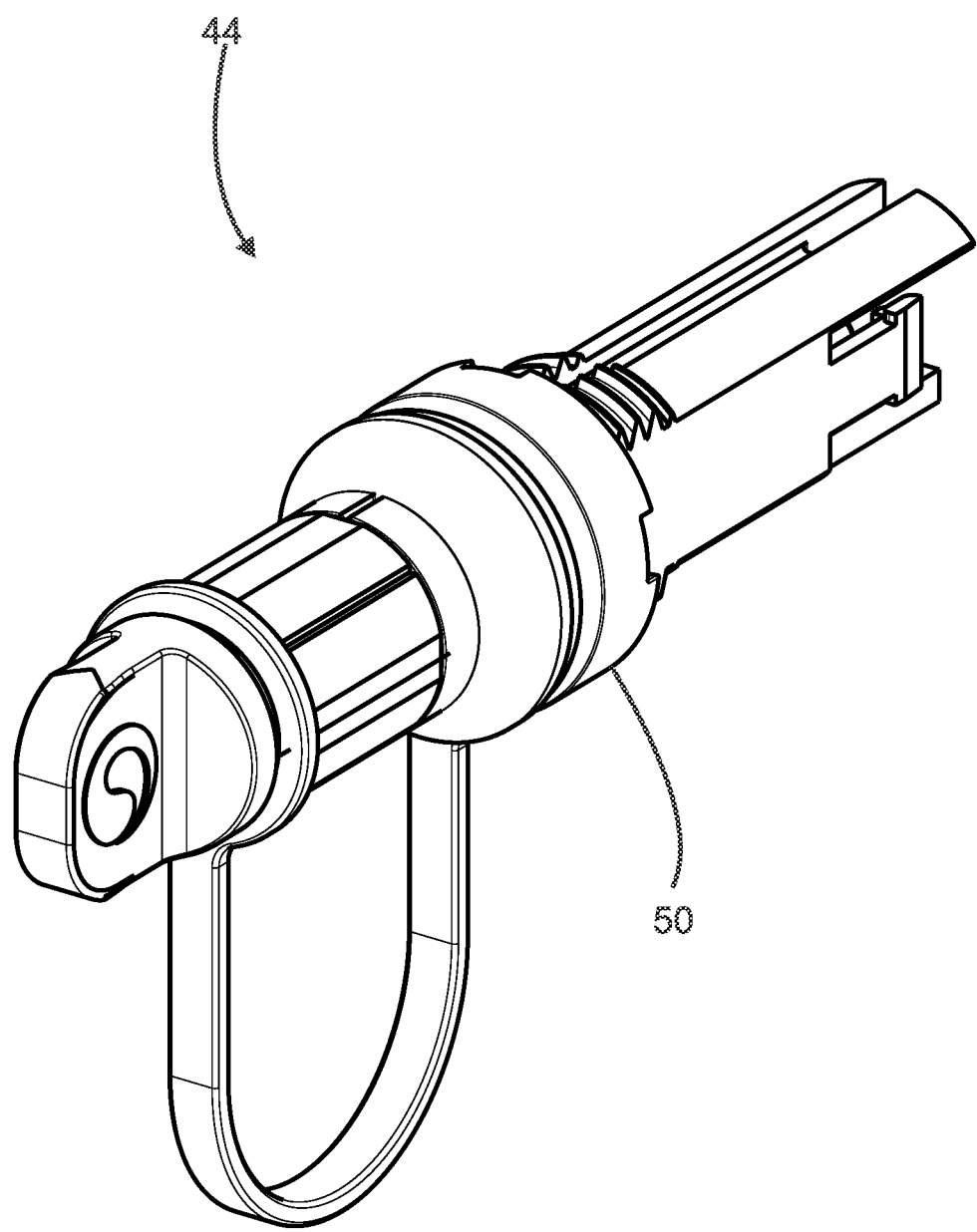
FIG. 5 is a perspective view of a second hardened fiber optic adapter having a different size and form factor than the first hardened fiber optic adapter.
Figure 6:
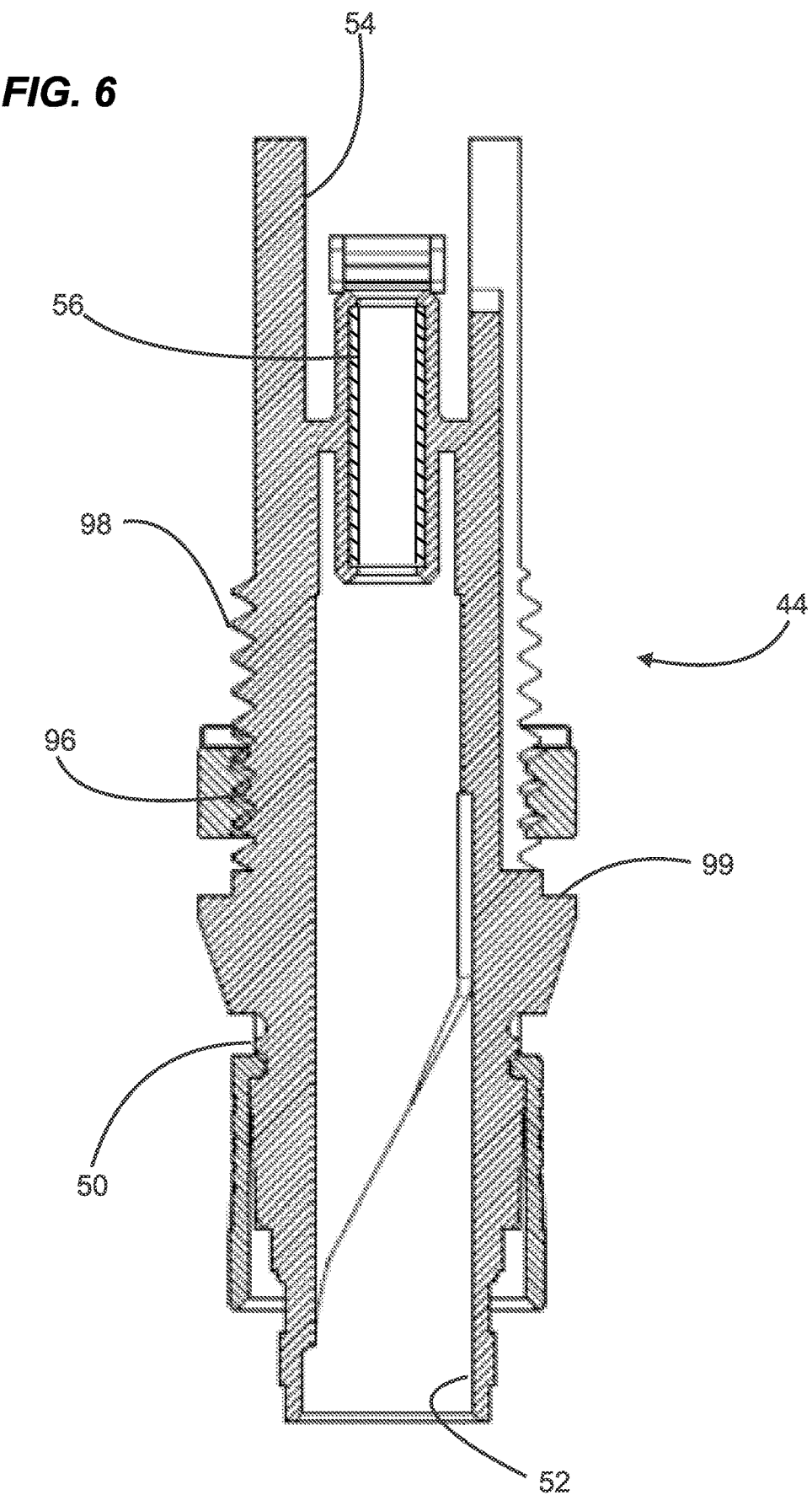
FIG. 6 is a longitudinal cross-sectional view of the second hardened fiber optic adapter of FIG. 5.
Figure 7:
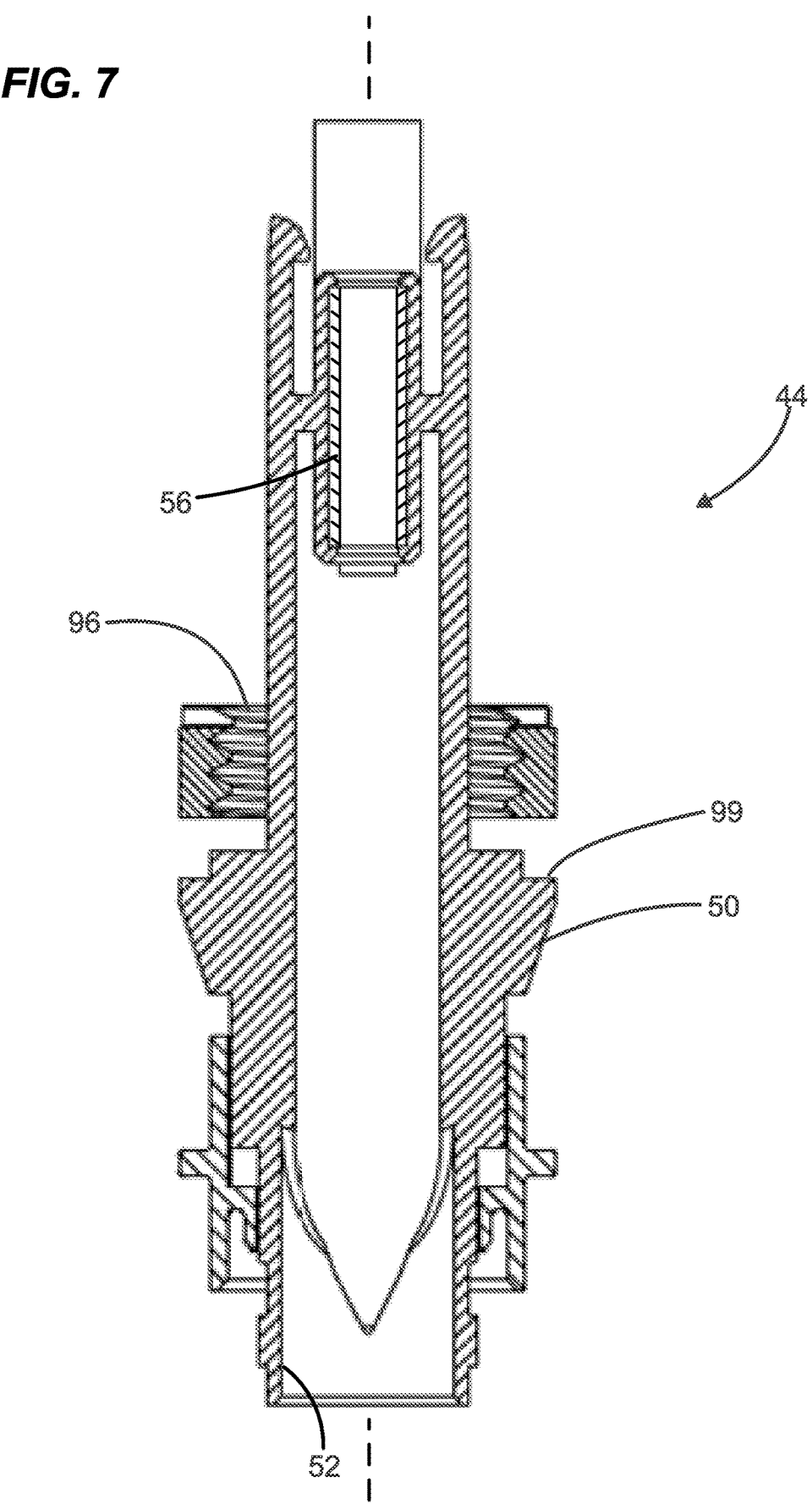
FIG. 7 is another longitudinal cross-sectional view of the second hardened fiber optic adapter of FIG. 5.
Figure 12:
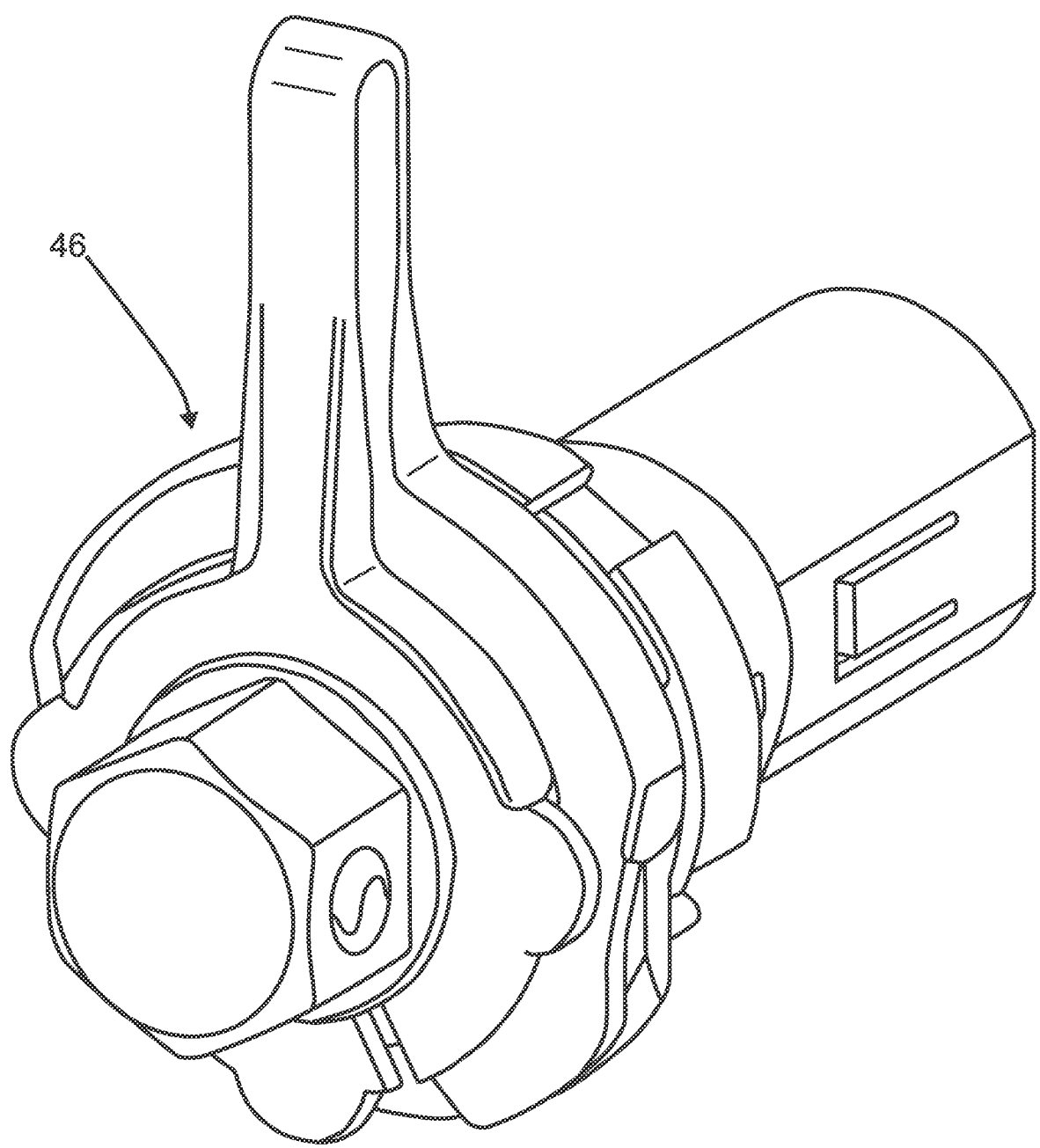
FIG. 12 is a perspective view of a third hardened fiber optic adapter having a different size and form factor than the first and second hardened fiber optic adapters.
Figure 13:
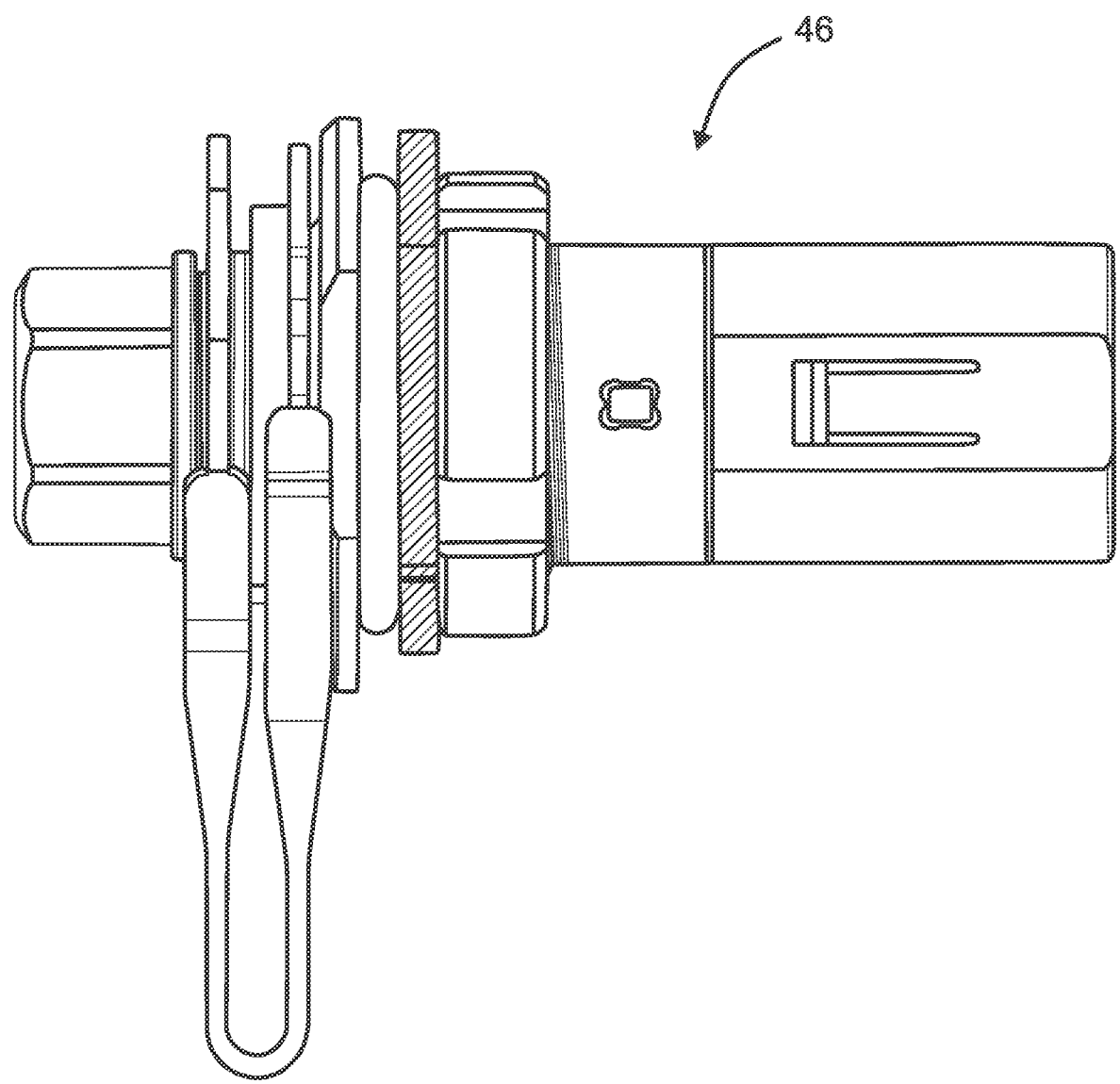
FIG. 13 is a side view of the third hardened fiber optic adapter of FIG. 12.

FIG. 4 is a plan view depicting one of the first adapter mounting openings 30 in comparison to second and third adapter mounting openings 40, 42. The second and third adapter mounting openings 40, 42 are smaller and have different form factors than the first adapter mounting opening 30. The second and third adapter mounting openings 40, 42 are compatible with second and third hardened fiber optic adapters that are smaller and have different form factors than the first fiber optic adapters 32. In one example, the second adapter mounting opening 40 is compatible with a second hardened fiber optic adapter 44 (see FIGS. 5-9) and the third adapter mounting opening 42 is compatible with a third hardened fiber optic adapter 46 (see FIGS. 12 and 13). In one example, the second type of hardened fiber optic adapter 44 is a Prodigy™ type fiber optic adapter and the third type of hardened fiber optic adapter 46 is a DLX™ type fiber optic adapter. Further details regarding the second type of hardened fiber optic adapter 44 can be found in PCT international publication number WO2021/041305 which is hereby incorporated by reference in its entirety. Further details regarding the third type of hardened fiber optic adapter 46 can be found in U.S. Pat. No. 7,744,288 which is hereby incorporated by reference in its entirety.

Figure 8:
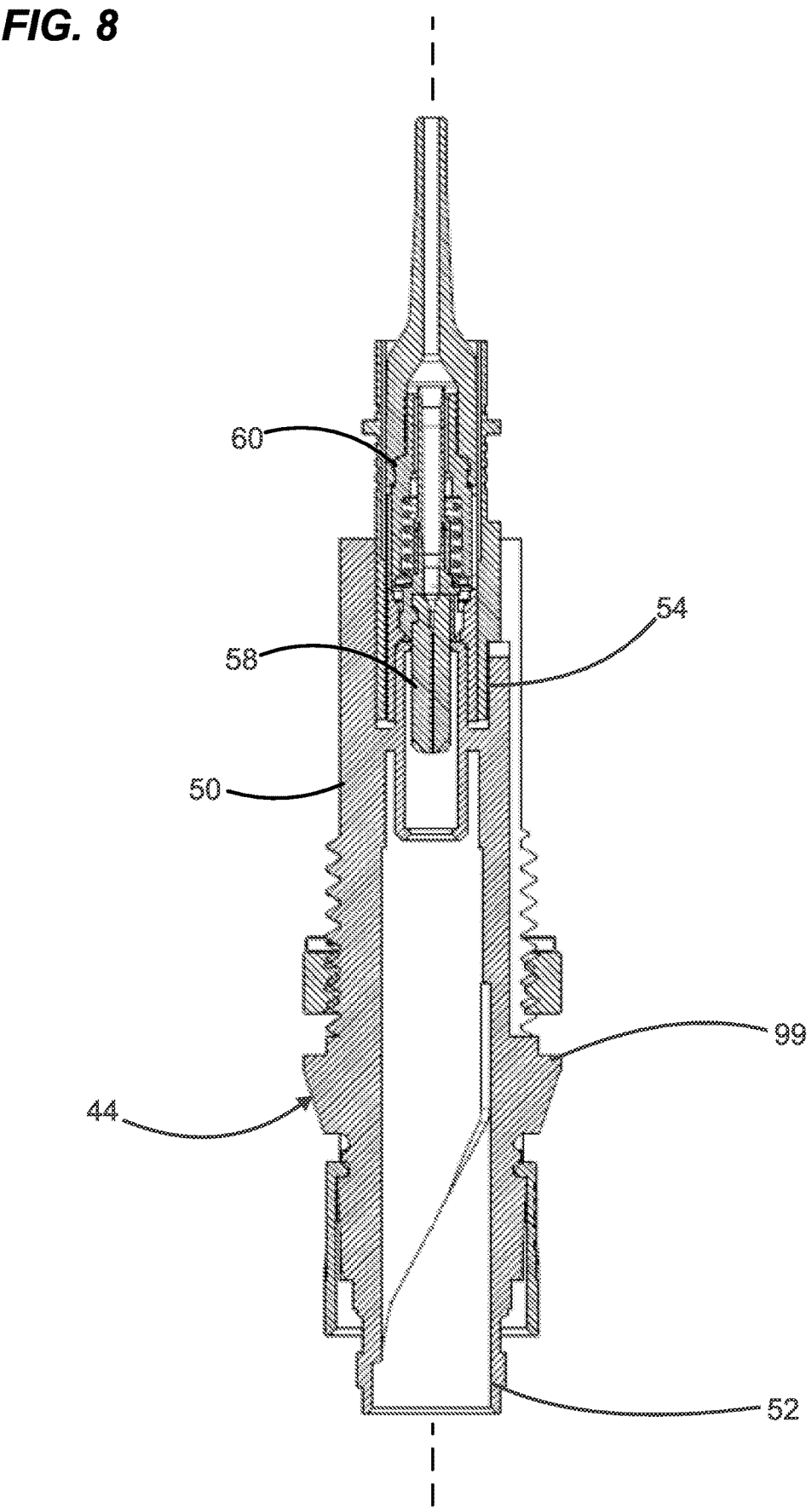
FIG. 8 is a longitudinal cross-sectional view of the second hardened fiber optic adapter of FIG. 5 with a non-hardened fiber optic connector installed within a non-hardened port of the hardened fiber optic adapter.
Figure 9:
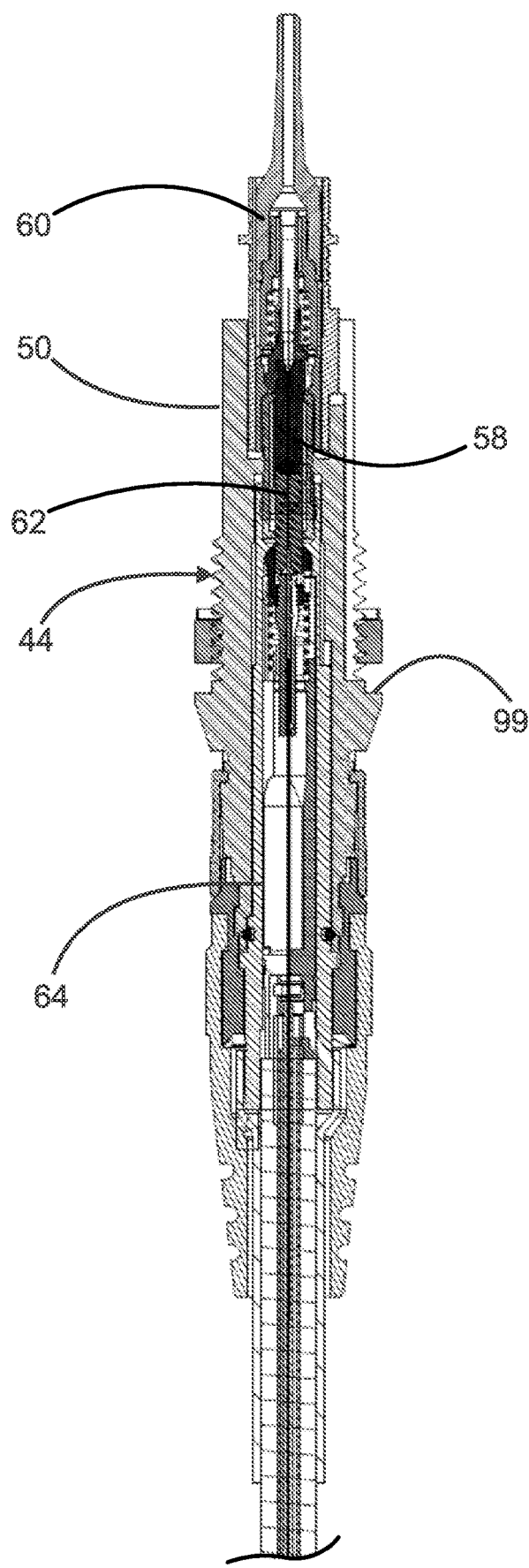
FIG. 9 is a longitudinal cross-sectional view of the second hardened fiber optic adapter of FIG. 5 with the non-hardened fiber optic connector installed within the non-hardened port of the hardened fiber optic adapter and with a hardened fiber optic connector installed within a hardened port of the hardened fiber optic adapter.

Referring to FIGS. 5-9, the second hardened fiber optic adapter 44 includes an adapter body 50 having an exterior form factor adapted to fit within (e.g., mate with) the form factor of the second adapter mounting opening 40. The adapter body 50 defines a hardened exterior port 52 and a non-hardened interior port 54. When the adapter body 50 is installed on a housing of a terminal, the exterior port 52 is accessible from the exterior of the terminal and the interior port 54 is accessible from within the interior of the terminal. The second fiber optic adapter 44 also includes a ferrule alignment sleeve 56 mounted within the adapter body 50. In one example, the ferrule alignment sleeve 56 is co-axially aligned with a through-passage defined by the adapter body 50. It will be appreciated that the ferrule alignment sleeve 56 is configured for coaxially aligning ferrules supporting optical fibers corresponding to fiber optic connectors inserted into the ports 52, 54. FIG. 8 shows the ferrule alignment sleeve 56 receiving a ferrule 58 of a non-hardened fiber optic connector 60 installed within the interior port 54. FIG. 9 shows the ferrule alignment sleeve 56 also receiving a ferrule 62 of a hardened fiber optic connector 64 installed within the exterior port 52. As depicted in FIG. 9, the ferrule alignment sleeve 56 functions to co-axially aligned the ferrules 58, 62 within the adapter body 50 such that optical fibers supported by the ferrules 58, 62 are optically coupled to one another.

FIG. 10 is a front view depicting a first converter 70 for converting one of the first adapter mounting openings 30 to one of the second adapter mounting openings 40. In this way, the first converter 70 is adapted for converting the first adapter mounting opening 30 [32] to be compatible with the second hardened fiber optic adapter 44. The first converter 70 includes a converter body 72 including a converter plate 74 defining one of the second adapter mounting openings 40. The converter body 72 also includes a converter flange 76 (e.g., a front flange) which surrounds the second adapter mounting opening 40. The converter body 72 also includes a portion 78 (e.g., a rear portion) that projects rearwardly from the flange 76 and defines an exterior form factor 79 adapted to fit within (e.g., complement, mate with, etc.) the form factor of the first adapter mounting opening 30.

Figure 11:
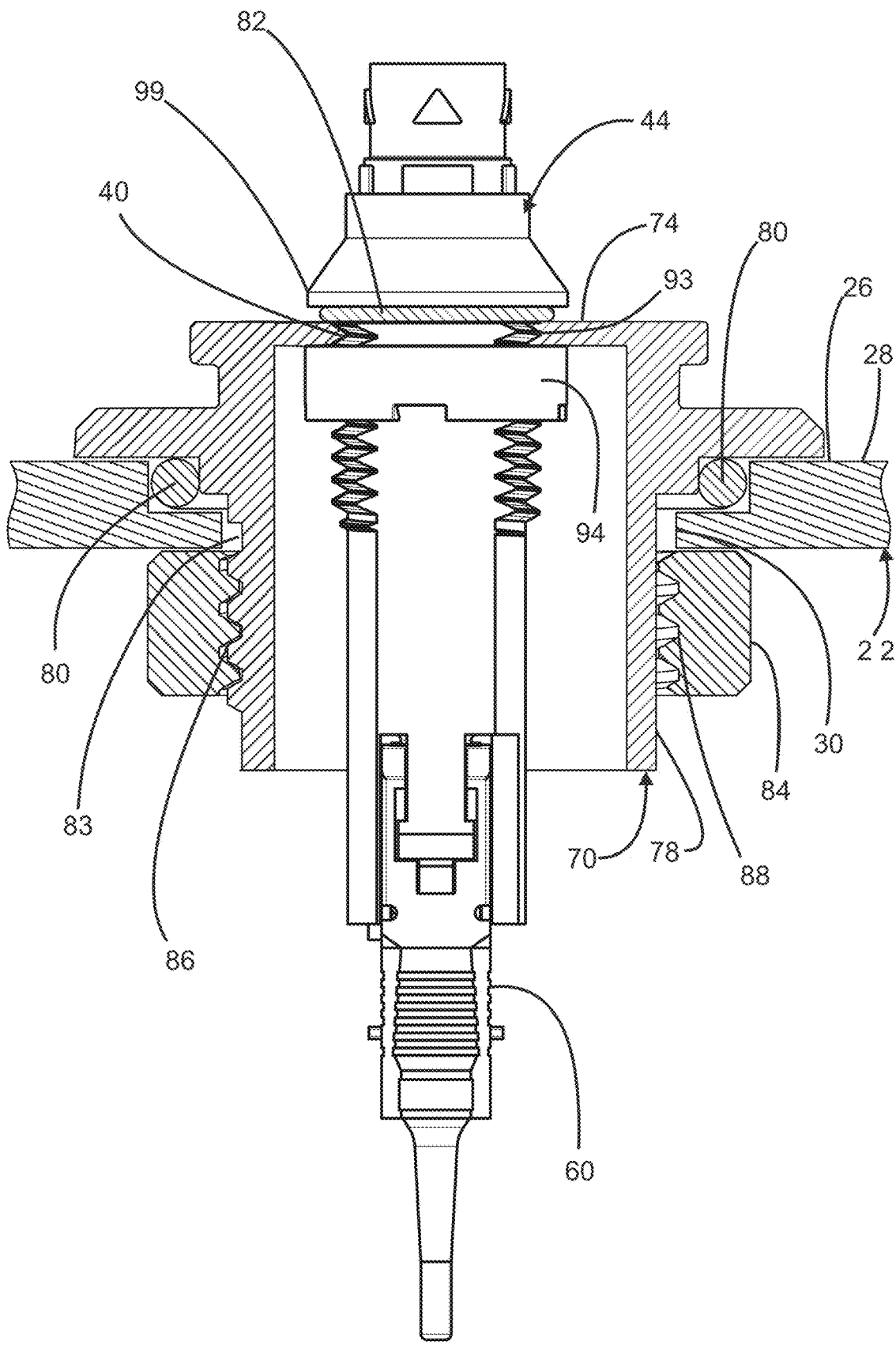
FIG. 11 is a cross-sectional view depicting the second hardened fiber optic adapter of FIG. 5 mounted on the converter of FIG. 10 which is shown installed within one of the first adapter mounting openings of the type shown at FIG. 1.

FIG. 11 depicts the first converter 70 secured within a first adapter mounting opening 30 defined by a housing wall 28 of a housing 22 (e.g., a terminal). The housing 22 has an interior 24 and an exterior 26. The first adapter mounting opening 30 extends between the interior 24 and the exterior 26 of the housing 22. In one example, the first adapter mounting opening 30 can have a form factor compatible with one of the first fiber optic adapters 32. One of the second fiber optic adapters 44 is depicted secured within the second adapter mounting opening 40 of the first converter 70. A first seal 80 (e.g., an elastomeric seal such as a gasket which may include a sealing ring such as an O-ring) is positioned to surround the first adapter mounting openings 30. The first seal 80 is compressed between the converter flange 76 of the first converter 70 and an exterior surface of the housing wall 28. A second seal 82 (e.g., an elastomeric seal such as a gasket which may include a sealing ring such as an O-ring) is positioned to surround the second adapter mounting openings 40. The second seal 82 is depicted being compressed between an adapter flange 99 of the adapter body 50 and an exterior surface of the converter body 72. In one example, the second seal 82 seals against the converter plate 74 of the converter body 72.

In the depicted example, the first converter 70 is secured within the first adapter mounting opening 30 by a first interior fastening arrangement. In certain examples, the first interior fastening arrangement can include a snap-fit arrangement including latching arms that latch the converter 70 within the first adapter mounting opening 30. In the depicted example, the first interior fastening arrangement includes a first turnable fastener 84 that mounts on an interior portion of the converter 70. In the depicted example, the first turnable fastener 84 is a threaded fastener. In the depicted example, the first turnable fastener 84 has internal threads 86 that engage external threads 88 on the interior portion of the converter 70. When the first converter 70 is installed in the first adapter mounting opening 30, the housing wall 28 is clamped between the exterior converter flange 76 and the first turnable fastener 84 and the first seal 80 is compressed between the exterior converter flange 76 and the exterior surface of the housing wall 28. In other examples, other types of turnable fasteners such as quarter-turn fasteners (e.g., bayonet-style fasteners) can be used.

In the depicted example, the second fiber optic adapter 44 is secured within the second adapter mounting opening 40 by a second interior fastening arrangement. In certain examples, the second interior fastening arrangement can include a snap-fit arrangement including latching arms that latch the second fiber optic adapter 44 within the second adapter mounting opening 40. In the depicted example, the second interior fastening arrangement includes a second turnable fastener 94 that mounts on an interior portion of the adapter body 50. In the depicted example, the second turnable fastener 94 is a threaded fastener. In the depicted example, the second turnable fastener 94 has internal threads 96 that engage external threads 98 on an interior portion of the adapter body 50. When the second fiber optic adapter 44 is installed in the second adapter mounting opening 40, the converter plate 74 is clamped between the adapter flange 99 and the second turnable fastener 94 and the second seal 82 is compressed between the adapter flange 99 and the exterior surface of the converter plate 74. In other examples, other types of turnable fasteners such as quarter-turn fasteners (e.g., bayonet-style fasteners) can be used.

FIG. 14 is a front view depicting a second converter 170 for converting one of the first adapter mounting openings 30 to one of the third adapter mounting openings 42. In this way, the second converter 170 is adapted for converting the first adapter mounting opening 30 to be compatible with the third hardened fiber optic adapter 46. The second converter 170 includes a converter body 172 including a converter plate 174 defining one of the third adapter mounting openings 42. The converter body 172 also includes a converter flange 176 (e.g., a front flange) which surrounds the third adapter mounting opening 42. The converter body 172 also includes a portion 178 (e.g., a rear portion) that projects rearwardly from the flange 176 and defines the exterior form factor 79 adapted to fit within (e.g., complement, mate with, etc.) the form factor of the first adapter mounting opening 30.

From the forgoing detailed description, it will be evident that modifications and variations can be made in the devices of the disclosure without departing from the spirit or scope of the invention.

What is claimed is:

1. An enclosure comprising:
 a housing having an interior and an exterior, the housing including a housing wall defining a first adapter mounting opening that extends between the interior and the exterior of the housing, the first adapter mounting opening having a first form factor corresponding to a first type of fiber optic adapter;
 a converter secured within the first adapter mounting opening, the converter including a converter plate defining a second adapter mounting opening having a second form factor corresponding to a second type of fiber optic adapter;
 a first seal surrounding the first adapter mounting opening, the first seal being compressed between the converter and the housing wall;
 a fiber optic adapter of the second type secured within the second adapter mounting opening, the fiber optic adapter of the second type including an adapter body defining an exterior adapter flange and an exterior port for receiving a fiber optic connector at the exterior of the housing, wherein the converter plate is clamped between the exterior adapter flange and a turnable fiber optic adapter fastening arrangement, the fiber optic adapter of the second type including a ferrule alignment sleeve mounted within the adapter body for receiving a ferrule of the fiber optic connector when the fiber optic connector is installed in the exterior port; and
 a second seal surrounding the second adapter mounting opening, the second seal being compressed between the exterior adapter flange and the converter plate, when the converter plate is clamped between the exterior adapter flange and the turnable fiber optic adapter fastener arrangement.

2. The enclosure of claim 1, wherein the converter has a form factor that mates with the first form factor.

3. The enclosure of claim 1, wherein the converter is secured within the first adapter mounting opening by a turn-to-secure fastener that is turnably secured on the converter and that opposes an interior surface of the housing wall.

4. The enclosure of claim 3, wherein the converter includes a flange that opposes an exterior surface of the housing, and wherein the first seal is compressed between the flange and the exterior surface of the housing.

5. The enclosure of claim 3, wherein the turn-to secure fastener is a threaded fastener having internal threads that engage external threads on the converter.

6. The enclosure of claim 1, wherein the converter is secured within the first adapter mounting opening by a converter fastening arrangement, wherein the converter includes an exterior converter flange, wherein when the converter is installed in the first adapter mounting opening the housing wall is clamped between the exterior converter flange and the converter fastening arrangement, and wherein the first seal is compressed between the exterior converter flange and an exterior surface of the housing when the housing wall is clamped between the exterior converter flange and the converter fastening arrangement.

7. The enclosure of claim 6, wherein the converter fastening arrangement includes a first turnable fastener that mounts on an interior portion of the converter.

8. The enclosure of claim 7, wherein the first turnable fastener is a first threaded fastener having internal threads that engage external threads on the interior portion of the converter.

9. The enclosure of claim 6, wherein the converter fastening arrangement includes a first turnable fastener that mounts on an interior portion of the converter, and wherein the turnable fiber optic adapter fastening arrangement includes a second turnable fastener that mounts on an interior portion of the adapter body.

10. The enclosure of claim 9, wherein the first turnable fastener is a first threaded fastener having internal threads that engage external threads on the interior portion of the converter, and wherein the second turnable fastener is a second threaded fastener having internal threads than engage external threads on the interior portion of the adapter body.

11. An enclosure comprising:
a housing having an interior and an exterior, the housing including a housing wall defining a first adapter mounting opening that extends between the interior and the exterior of the housing, the first adapter mounting opening having a first form factor corresponding to a first type of fiber optic adapter;
a converter secured within the first adapter mounting opening, the converter including a converter plate positioned outside of the exterior of the housing, the converter plate defining a second adapter mounting opening having a second form factor corresponding to a second type of fiber optic adapter;
a first seal surrounding the first adapter mounting opening, the first seal being compressed between the converter and the exterior of the housing;
a fiber optic adapter of the second type secured within the second adapter mounting opening, the fiber optic adapter of the second type including an adapter body defining an exterior adapter flange and an exterior port for receiving a fiber optic connector, the exterior adapter flange being positioned further outside of the converter plate at the exterior of the housing, the fiber optic adapter of the second type including a ferrule alignment sleeve mounted within the adapter body for receiving a ferrule of the fiber optic connector when the fiber optic connector is installed in the exterior port; and
a second seal surrounding the second adapter mounting opening, the second seal being compressed between the exterior adapter flange and the converter plate.

12. An enclosure comprising:
a housing having an interior and an exterior, the housing including a housing wall defining a first adapter mounting opening that extends between the interior and the exterior of the housing, the first adapter mounting opening having a first form factor corresponding to a first type of fiber optic adapter;
a converter secured within the first adapter mounting opening, the converter including a converter plate positioned outside of the exterior of the housing, the converter plate defining a second adapter mounting opening having a second form factor corresponding to a second type of fiber optic adapter;
a first seal surrounding the first adapter mounting opening, the first seal being compressed between the converter and the exterior of the housing;
a fiber optic adapter of the second type secured within the second adapter mounting opening, the fiber optic adapter of the second type including an adapter body defining an exterior adapter flange and an exterior port for receiving a fiber optic connector,
wherein the exterior adapter flange is positioned further outside of the converter plate at the exterior of the housing,
wherein the converter plate is clamped between the exterior adapter flange and a turnable fiber optic adapter fastening arrangement,
the fiber optic adapter of the second type further including a ferrule alignment sleeve mounted within the adapter body for receiving a ferrule of the fiber optic connector when the fiber optic connector is installed in the exterior port; and
a second seal surrounding the second adapter mounting opening, the second seal being compressed between the exterior adapter flange and the converter plate when the converter plate is clamped between the exterior adapter flange and the turnable fiber optic adapter fastening arrangement.

* * * * *